US012666383B2

(12) United States Patent
Cao et al.

(10) Patent No.: US 12,666,383 B2
(45) Date of Patent: Jun. 23, 2026

(54) REGISTRATION METHOD AND APPARATUS FOR TERMINAL UE, ELECTRONIC DEVICE, AND STORAGE MEDIUM

(71) Applicant: NEW H3C TECHNOLOGIES CO., LTD., Zhejiang (CN)

(72) Inventors: Meng Cao, Beijing (CN); Yi Peng, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 318 days.

(21) Appl. No.: 18/564,312

(22) PCT Filed: Nov. 25, 2022

(86) PCT No.: PCT/CN2022/134239
§ 371 (c)(1),
(2) Date: Nov. 27, 2023

(87) PCT Pub. No.: WO2023/098575
PCT Pub. Date: Jun. 8, 2023

(65) Prior Publication Data
US 2024/0259980 A1 Aug. 1, 2024

(30) Foreign Application Priority Data

Nov. 30, 2021 (CN) .......................... 202111449427.6

(51) Int. Cl.
*H04W 60/04* (2009.01)
*H04W 12/108* (2021.01)
(Continued)

(52) U.S. Cl.
CPC ......... *H04W 60/04* (2013.01); *H04W 12/108* (2021.01); *H04W 48/08* (2013.01); *H04W 48/18* (2013.01)

(58) Field of Classification Search
CPC ... H04W 60/04; H04W 12/108; H04W 48/08; H04W 48/18; H04W 76/18; H04W 60/00; H04W 76/12
See application file for complete search history.

(56) References Cited

U.S. PATENT DOCUMENTS

2020/0322879 A1* 10/2020 Zhu ........................ H04W 60/00
2020/0413244 A1* 12/2020 Park ...................... H04W 76/27
(Continued)

FOREIGN PATENT DOCUMENTS

CN 109151933 A 1/2019
CN 109964509 A 7/2019
(Continued)

OTHER PUBLICATIONS

European Patent Office, Extended European Search Report Issued in Application No. 22900380.1, Aug. 6, 2024, Germany, 13 pages.
(Continued)

*Primary Examiner* — Dady Chery
(74) *Attorney, Agent, or Firm* — Greenblum & Bernstein, P.L.C.

(57) ABSTRACT

The present disclosure provides a method and an apparatus for user equipment (UE) registering, an electronic device and a storage medium. Under 5G core network slice isolation networking, when an AMF network element detects that a UE is unsuccessfully registered on the AMF network element, the AMF network element sends to the UE a registration reject message comprising at least a first cell and a second cell. In this way, when the UE sends registration information again, the UE can select target network slice information based on network slice information configured in the first cell. And a 5G base station, when receiving the registration information from the UE, determines a corresponding target AMF network element based on the target network slice information in the requested NSSAI, such that (Continued)

the UE can be successfully registered to the target AMF network element.

15 Claims, 4 Drawing Sheets

(51) Int. Cl.
    *H04W 48/08*     (2009.01)
    *H04W 48/18*     (2009.01)

(56)            References Cited

U.S. PATENT DOCUMENTS

| | | | | |
|---|---|---|---|---|
| 2021/0007027 | A1* | 1/2021 | Yang | H04W 36/12 |
| 2022/0086790 | A1* | 3/2022 | Wang | H04W 60/04 |
| 2024/0073848 | A1* | 2/2024 | Ryu | H04W 36/08 |
| 2024/0349179 | A1* | 10/2024 | Starsinic | H04W 48/16 |
| 2024/0430755 | A1* | 12/2024 | Talebi Fard | H04W 36/0033 |

FOREIGN PATENT DOCUMENTS

| | | |
|---|---|---|
| CN | 113115434 A | 7/2021 |
| CN | 113194518 A | 7/2021 |
| CN | 113676927 A | 11/2021 |
| CN | 113709764 A | 11/2021 |
| CN | 113950141 A | 1/2022 |
| JP | 2020519155 A | 6/2020 |
| WO | 2021063744 A1 | 4/2021 |
| WO | 2021185176 A1 | 9/2021 |
| WO | 2021203947 A1 | 10/2021 |
| WO | 2021209976 A1 | 10/2021 |
| WO | 2021233050 A1 | 11/2021 |

OTHER PUBLICATIONS

Huawei et al: "Clarification on NSSAI inclusion mode",3GPP TSG-CT WG1 Meeting #128-e, Electronic meeting, Feb. 25-Mar. 5, 2021, C1-210977, XP-51990036A, 4 pages.
ISA State Intellectual Property Office of the People's Republic of China, Written Opinion of the International Searching Authority Issued in Application No. PCT/CN2022/134239, Feb. 22, 2023, WIPO, 9 pages.
Japanese Patent Office , Office Action Issued in Application No. 2023-575627, Dec. 4, 2024, 6 pages.
Qualcomm Incorporated, "TS 23.501—Proposal for co-existence of network slices stemming from offline discussion", S2-174442, SA WG2 Meeting #S2-122, Jun. 26-30, 2017, San Jose Del Cabo, Mexico, 10 pages.
Nokia, Nokia Shanghai Bell,Qualcomm Incorporated, "Network selection for NR satellite access", S2-2101667, 3GPP TSG-SA WG2 Meeting #143E, Feb. 24-Mar. 9, 2021, Elbonia, 32 pages.
ISA State Intellectual Property Office of the People's Republic of China, International Search Report Issued in Application No. PCT/CN2022/134239, Feb. 22, 2023, WIPO, 3 pages.
Ericsson /kaj., "Configured NSSAI in registration reject message",3GPP TSG-CT WG1 Meeting #120 Portoroz (Slovenia) C1-196195, Sep. 30, 2019, 13 pages.
Li Liping et al., "The Technical Solutions and Construction Strategies for 5G Private Networks", Mobile Communication, Mar. 15, 2020, 6 pages with English Abstract.

* cited by examiner

REGISTRATION METHOD AND APPARATUS FOR TERMINAL UE, ELECTRONIC DEVICE, AND STORAGE MEDIUM

CROSS-REFERENCE TO RELATED APPLICATIONS

This application is a national stage of international PCT Application No. PCT/CN2022/134239 filed on Nov. 25, 2022, which claims a priority to a Chinese Patent Application with the corresponding application number being 202111449427.6 and the application date being Nov. 30, 2021, the entire contents of which are incorporated herein by reference

TECHNICAL FIELD

The present disclosure relates to the field of 5G network technologies, and in particular to a method and an apparatus for user equipment registering, an electronic device, and a storage medium.

BACKGROUND 5G network communication technology is one of the current network communication technologies. Compared with 4G network communication technology, the 5G network communication technology has remarkable advantages in transmission rate. However, in practical applications where a user equipment (UE) is located in a networking scenario under 5G network slice isolation, when the UE moves from a coverage scope of an original 5G base station to a coverage scope of a next 5G base station, if the UE does not carry valid identity information and network slice information, the next 5G base station defaults that the UE will access a set access and mobility management function (AMF) network element configured by the 5G base station by default. The set AMF network element can send a security establishment flow to the UE. After an authentication/security flow therein is successful, the set AMF network element interacts with a network slice selection function (NSSF) network element at the 5G core network to perform network slice selection. The NSSF network element indicates that the AMF network element capable of serving the UE is AMF Set1. At this time, the set AMF network element originates an AMF reallocation flow through the 5G base station, so as to reroute a UE registration message to the AMF Set1. When an AMF1 network element in the AMF Set1 receives the UE registration message rerouted by the 5G base station, since the AMF1 network element does not have a valid context of the UE, the AMF1 network element can perform the authentication/security flow with the UE again. Since the UE has no perception for the entire rerouting process, the UE has already performed security flow with the set AMF network element and thus cannot process the non-encrypted authentication message distributed by the AMF1 network element. Finally, the registration flow of the AMF1 network element cannot be continued and the UE cannot be notified of registration rejection. As a result, the registration of the UE will expire. Then, the UE needs to re-originate a registration flow to the 5G base station to repeat the above processes, leading to failure of the UE to register smoothly in the 5G base station.

SUMMARY

The present disclosure provides a method and an apparatus for user equipment (UE) registering, an electronic device and a storage medium, so as to solve the problem that the UE cannot be normally registered based on an access and mobility function (AMF) network element reallocation flow of a 5G base station under 5G core network slice isolation networking.

The present disclosure provides the following technical solution.

According to a first aspect of embodiments of the present disclosure, there is provided a method of UE registering, which is applied to an AMF network element at a 5G core network. The method includes:

receiving registration information of the UE from a 5G base station;

when the UE is unsuccessfully registered on the AMF network element, sending a registration reject message including at least a first cell and a second cell to the UE; where the first cell includes network slice information configured for the AMF network element, and the second cell is configured to indicate the UE to carry requested network slice selection assistance information (NSSAI) in an access stratum (AS) in a registration request originated after receiving the registration reject message;

where the requested NSSAI includes target network slice information selected by the UE based on the first cell; the requested NSSAI is configured to indicate the 5G base station, in response to receiving the registration request including the requested NSSAI from the UE, determines a corresponding target AMF network element based on the target network slice information in the requested NSSAI, such that the UE is successfully registered to the target AMF network element.

According to a second aspect of embodiments of the present disclosure, there is provided an apparatus for user equipment (UE) registering. The apparatus includes:

a registration information receiving unit, configured to receive registration information of a UE from a 5G base station;

a registration reject message sending unit, configured to, when the UE is unsuccessfully registered on the AMF network element, send a registration reject message including at least a first cell and a second cell to the UE; where the first cell includes network slice information configured for the AMF network element, and the second cell is configured to indicate the UE to carry requested network slice selection assistance information (NSSAI) in an access stratum (AS) in a registration request originated after receiving the registration reject message;

where the requested NSSAI includes target network slice information selected by the UE based on the first cell; the requested NSSAI is configured to indicate the 5G base station, in response to receiving the registration request including the requested NSSAI from the UE, determines a corresponding target AMF network element based on the target network slice information in the requested NSSAI such that the UE is successfully registered to the target AMF network element.

According to a third aspect of embodiments of the present disclosure, there is provided an electronic device, including a processor and a machine-readable storage medium. The machine-readable storage medium is configured to store machine-executable instructions; the processor is configured to read and execute the machine-executable instructions stored in the machine-readable storage medium to perform the method as described in the above first aspect.

According to a fourth aspect of embodiments of the present disclosure, there is provided a machine-readable storage medium, storing computer programs, where the computer programs are executed by a processor to perform the method as described in the above first aspect.

From the above technical solution, it can be seen that, in the present disclosure, under 5G core network slice isolation networking, when an AMF network element detects that a UE is unsuccessfully registered on the AMF network element, the AMF network element sends to the UE a registration reject message, which includes a first cell including network slice information configured for the AMF network element and a second cell for indicating the UE to carry requested NSSAI in an AS in a registration request originated after receiving the registration reject message. In this way, when the UE sends registration information again, the UE can select target network slice information based on the first cell, and the 5G base station, in response to receiving the registration information including the requested NSSAI from the UE, determines a corresponding target AMF network element based on the target network slice information in the requested NSSAI, such that the UE can be successfully registered to the target AMF network element. Therefore, by applying the registration method provided by the embodiments of the present disclosure, the problem that the UE cannot be normally registered based on an AMF network element reallocation flow of RAN (Radio Access Network) under 5G core network slice isolation networking can be solved.

DETAILED DESCRIPTION OF THE EMBODIMENTS

Figure 1:
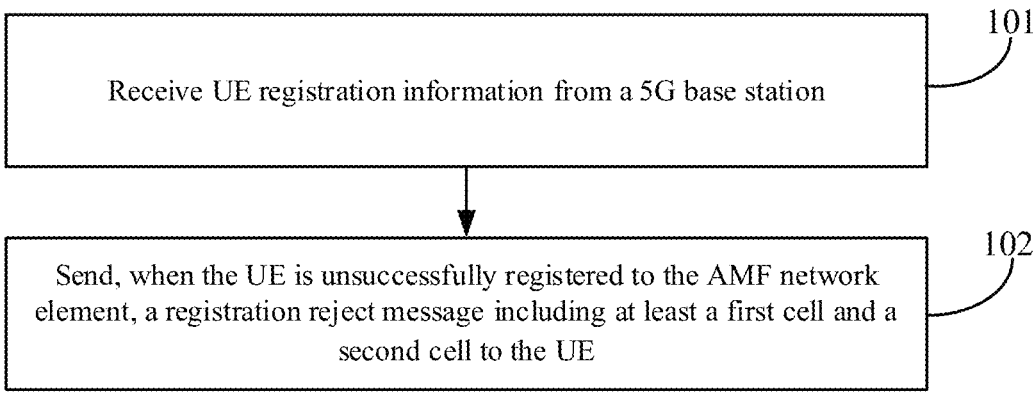
FIG. 1 is a flowchart illustrating a method of UE registering according to the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like can be used in the present disclosure to describe various information, such information should not be limited to these terms. These terms are only used to distinguish one category of information from another. For example, without departing from the scope of the present disclosure, first information can be referred as second information; and similarly, the second information can also be referred as the first information. Depending on the context, the term "if" as used herein can be interpreted as "when" or "upon" or "in response to determining".

FIG. 1 is a flowchart illustrating a method of user equipment (UE) registering according to the present disclosure. The method is applied to an access and mobility function (AMF) network element at a 5G core network.

The AMF network element is a major functional unit of the 5G, which completes access and mobility management for the UE. During a UE registration process, an AMF network element reallocation flow can be involved. The specific UE registration process will be detailed below.

At first step, the 5G base station obtains an initial message including UE registration information from the UE, and sends the initial message to a configured initial AMF network element, so as to serve the UE. The UE registration information is used for a registration request of the UE and can include parameters such as a registration type, a user identifier, a UE capability and a requested slice.

At second step, the initial AMF network element needs to determine whether the UE has ever been registered on the initial AMF network element. If not, the initial AMF network element needs to use a subscription permanent identifier (SUPI) to obtain subscription information of the UE to determine whether to reroute the registration request, or, if the UE registration information sent by the UE is not subjected to integrity protection or fails in integrity protection, the initial AMF network element needs to identity the UE and further perform authentication/security flow between the initial AMF network element and the UE.

At third step, the initial AMF network element obtains subscribed data of the UE including UE-subscribed network slice information from a unified data management (UDM). After obtaining the subscribed data, the initial AMF network element, based on the subscribed data and the requested network slice selection assistance information (NSSAI) in the UE registration information, performs network slice selection via a network slice selection function (NSSF) network element to select network slice information capable of serving the UE.

At fourth step, the initial AMF network element determines that AMF network element reallocation is required and there is/are old AMF network element(s), the initial AMF network element sends a state update to the old AMF network element(s) to notify that the UE registration flow is not completed in the initial AMF network element.

At fifth step, based on the network slice information capable of serving the UE, which is selected by the NSSF network element in the third step, the initial AMF network element sends a request for performing service discovery to a network repository function (NRF) network element to query for information of a target AMF network element.

At sixth step, after the target AMF network element is determined, the initial AMF network element enters the AMF network element reallocation flow. The AMF network element reallocation flow mainly includes two reallocation methods. One reallocation method is directed to an application scenario where a non-access stratum (NAS) message is directly forwarded between the initial AMF network element and the target AMF network element. The specific process includes as follows: the initial AMF network element, based on a result of the service discovery performed by the NRF network element, sends the UE registration information via a service interface between the initial AMF network element and the target AMF network element to the target AMF network element for processing. The other reallocation method is directed to a scenario under 5G network slice isolation networking as described in the present disclosure. In this networking scenario, a plurality of network slices share the 5G base station, different network slices use different AMF network elements, and AMF network elements are network isolated. Based on a networking plan, the AMF network element reallocation flow can only be communicated through the 5G base station, that is, the initial AMF network element indirectly forwards the NAS message through the 5G base station. The initial AMF network element encapsulates the UE registration information into a reroute NAS message which is then sent to the 5G base station. The 5G base station then sends the UE registration information to the target AMF network element in the form of initial message.

At seventh step, after receiving the UE registration information, the target AMF network element performs processing based on the existing registration flow.

The embodiment is mainly directed to the AMF network element reallocation flow in a scenario under 5G network slice isolation networking.

The flow implemented based on FIG. 1 can include the following steps.

At step 101, UE registration information is received from a 5G base station.

Based on the above descriptions of the UE registration process, when a UE is in a scenario under 5G network slice isolation networking, it is defaulted that a configured AMF network element receives the UE registration information sent by the UE through the 5G base station.

The UE registration information can be UE registration information sent by the UE for the first time; the UE registration information can also be UE registration information sent by the UE by rerouting, which means the current processing enters the AMF network element reallocation flow.

At step 102, when the UE is unsuccessfully registered to the AMF network element, a registration reject message including at least a first cell and a second cell is sent to the UE.

The first cell includes network slice information configured for the AMF network element, and the second cell is configured to indicate the UE to carry requested network slice selection assistance information (NSSAI) in an access stratum (AS) in a registration request originated after receiving the registration reject message. In the present disclosure, the AS can be understood as an AS by which the UE interacts the 5G base station. That is, after receiving the registration reject message, the requested NSSAI is included in the registration request re-originated by the UE, and when the UE accesses the 5G base station, the AS can carry the requested NSSAI.

The first cell and the second cell are named only for ease of descriptions rather than for limiting a particular cell.

The requested NSSAI includes target network slice information selected by the UE based on the first cell; the requested NSSAI is configured to indicate the 5G base station, in response to receiving the registration request including the requested NSSAI in the AS from the UE, determines a corresponding target AMF network element based on the target network slice information in the requested NSSAI, such that the UE is successfully registered to the target AMF network element.

Figure 2:
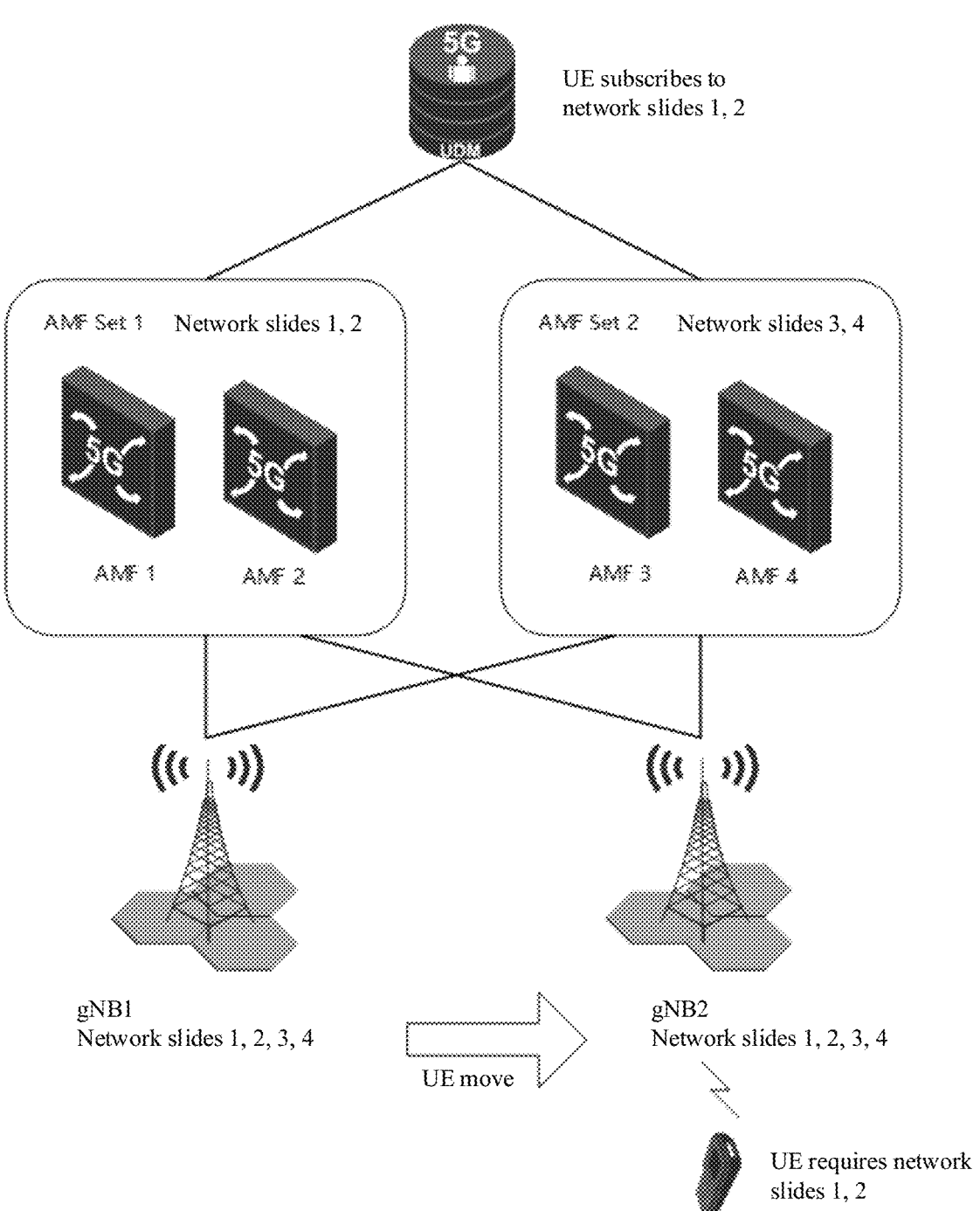
FIG. 2 is a schematic diagram of UE registering in a first scenario under 5G network slice isolation according to the present disclosure.

In the scenario under 5G network slice isolation networking, the UE can be unsuccessfully registered to the AMF network element in the following application scenarios. One application scenario leading to unsuccessful registration is as follows: the UE registration information in step 101 is sent by the 5G base station when the UE is moved from the coverage scope of other 5G base station to the coverage scope of the 5G base station. Taking an example, in the networking scenario as shown in FIG. 2, there are at least two 5G base stations, gNB1 and gNB2. The gNB1 supports the network slices 1, 2, 3, and 4, and an AMF1 network element in an AMF Set1 is preferably selected based on default configuration, where AMF Set1 supports the network slices 1 and 2, the AFM network elements in the AMF Set1 are equivalent to each other and all support the network slices 1 and 2. The gNB2 supports the network slices 1, 2, 3, and 4, and an AMF3 network element in an AMF Set2 is preferably selected based on default configuration, where the AMF Set2 supports the network slices 3, and 4, the AMF network elements in the AMF Set2 are equivalent to each other and all support the network slices 3 and 4. The UE subscribes to the network slices 1 and 2 on the UDM, which means that the network slices 1 and 2 are already subscribed to for serving the UE.

The UE originates a registration flow upon first access in the gNB1.

The gNB1 defaults that the UE will access the AMF1 network element in the AMF Set1. The UE is successfully registered on the AMF1 network element, and information of an allowed NSSAI network element and a configured NSSAI network element and the like is obtained from a registration acceptance message.

The UE moves from the coverage scope of the gNB1 to the coverage scope of the gNB2 and performs access again in the gNB2. If the AS by which the UE interacts with the gNB2 does not include valid identity information and network slice information, the gNB2 defaults that the UE will access the AMF3 network element in the AMF Set2. At this time, due to no user context, the AMF3 network element originates a security flow to the UE.

After security negotiation is completed, the AMF3 network element interacts with the NSSF network element to perform network slice selection. After network slice selection decision, it is determined that AMF network element reallocation is required and that the target AMF Set is indicated as AMF Set1.

The AMF3 network element performs AMF network element reallocation flow through the gNB2, indicating rerouting the UE registration information to the AMF Set1. At this time, the AMF1 network element in the AMF Set1 receives an initial message rerouted by the gNB2. The valid contexts originally registered by the UE on the 5G base station (i.e., gNB1) and the core network will be deleted after movement of the UE, which means that the valid context of the UE in the AMF1 network element will also be deleted. Thus, there is no valid user context on the AMF1 network element, and the AMF1 network element needs to perform authentication/security flow with the UE again. Since the UE has no perception for the entire rerouting process, the UE has already performed security flow with the AMF3 network element and thus cannot process the non-encrypted authentication message distributed by the AMF1 network element. Finally, the registration flow of the AMF1 network element cannot be continued and the AMF1 network element cannot notify the UE of registration rejection. As a result, the registration of the UE will expire. Then, the UE needs to re-originate a registration flow to the gNB2 to repeat the above processes, leading to failure of the UE to register smoothly in the gNB2.

Figure 3:
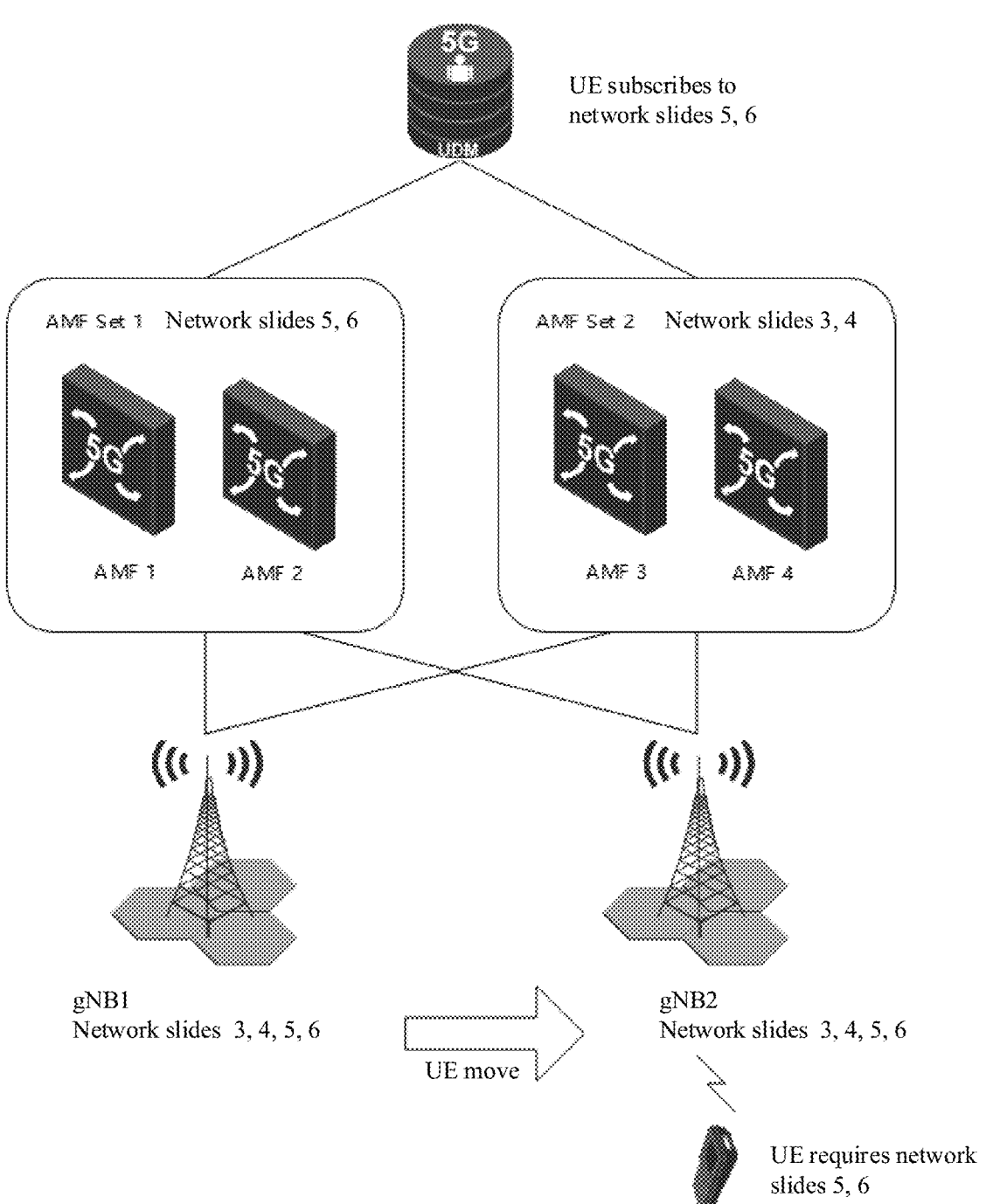
FIG. 3 is a schematic diagram of UE registering in a second scenario under 5G network slice isolation according to the present disclosure.

Another application scenario leading to unsuccessful registration is as follows: the UE registration information in step 101 is sent by the 5G base station under the condition that when the UE, after being successfully registered, is power off and then is moved out to the coverage scope of the 5G base station and power on. Taking another example, in the networking scenario shown in FIG. 3, the UE is successfully registered on the AMF Set1 in the above networking and then power off. The above networking configuration is re-modified as follows: the gNB1 supports the network slices 3, 4, 5, and 6, the AMF1 network element in the AMF Set1 is preferably selected based on default configuration. The gNB2 supports the network slices 3, 4, 5, and 6, the AMF3 network element in the AMF Set2 is preferably selected based on default configuration. The AMF Set1 supports network slices 5 and 6, and the AMF Set2 supports the network slices 3 and 4. The UE subscribes to the network slices 5 and 6 on the UDM.

When the UE moves into the coverage scope of the gNB2, the UE is power on again to access the network. The requested NSSAI included in the UE registration information of UE indicates the network slices 1 and 2. The gNB2 defaults that the UE will access the AMF3 network element in the AMF Set2. At this time, due to no user context, the AMF3 network element originates a security flow to the UE.

After security negotiation is completed, the AMF3 network element interacts with the NSSF network element to perform network slice selection. After network slice selection decision, it is determined that AMF network element reallocation is required and that the target AMF Set is indicated as AMF Set1.

The AMF3 network element performs AMF network element reallocation flow through the gNB2, indicating rerouting the UE registration information to the AMF Set1. The AMF1 network element receives an initial message rerouted by the gNB2. There is no valid context of the UE on the AMF1 network element, and the AMF1 network element needs to perform authentication/security flow with the UE again. Since the UE has no perception for the entire rerouting process, the UE has already performed security flow with the AMF3 network element and thus cannot process the non-encrypted authentication message distributed by the AMF1 network element. Finally, the registration flow of the AMF1 network element cannot be continued and the AMF1 network element cannot notify the UE of registration rejection. As a result, the registration of the UE will expire, then, the UE needs to re-originate a registration flow to the gNB2 to repeat the above processes, leading to failure of the UE to register smoothly in the gNB2.

In conclusion, it can be seen from the above two embodiments that the UE is unsuccessfully registered when performing AMF network element reallocation flow.

The registration reject message in step 102 indicates rejecting this registration of the UE and includes the above newly-added first cell and second cell. In this way, the UE can select target network slice information for serving the UE from latest network slice information configured in the first cell to construct the requested NSSAI. These network slices can be one separate network slice or a network slice list including a plurality of network slices, which is not limited herein.

When the UE re-originates a UE registration request through the 5G base station, the AS interacting with the 5G base station in the registration request includes the requested NSSAI. When the 5G base station receives the registration request including the requested NSSAI from the UE, the 5G base station can perceive the requested NSSAI and thus can determine a corresponding target AMF network element based on the target network slice information in the requested NSSAI, such that the UE can be successfully registered on the target AMF network element. In this way, the problem that the UE cannot be successfully registered in an invalid AMF network element reallocation flow can be avoided.

As an embodiment, the first cell is a configured NSSA and the second cell is a NSSAI inclusion mode. Thus, the AMF network element sends the registration reject message with the configured NSSA and the NSSAI inclusion mode to the UE, such that the UE selects target network slice information capable of serving the UE from the network slice information in the configured NSSA to construct the requested NSSAI. When receiving a registration request including the requested NSSAI from the UE, the 5G base station selects a correct target AMF network element based on the target network slice information in the requested NSSAI. The NSSAI inclusion mode in this embodiment can notify the base station of the requested NSSAI included in the UE registration information, and the base station can, based on the requested NSSAI, select an AMF set capable of serving the UE. Thus, the base station can select a correct AMF network element from the AMF set. If NSSAI inclusion mode is not included, when the UE sends UE registration information again, the UE will not notify the base station of the requested NSSAI. Hence, the base station cannot select a correct AMF network element, further leading to failure of registration.

As an embodiment, after the UE is successfully registered, the AMF network element obtains completion information for indicating successful registration from the 5G base station; and sends the completion information to the UE through the 5G base station. In this case, the UE can know that the UE itself has been successfully registered and will no longer send the registration request.

Here, the descriptions as shown in FIG. 1 are completed.

It can be seen from the above technical solutions that in the present disclosure, in the scenario under 5G core network slice isolation networking, when the AMF network element finds that the UE is unsuccessfully registered on the AMF network element, the AMF network element sends to the UE the registration reject message, which includes the first cell including the network slice information configured for the AMF network element and the second cell for indicating the UE to carry the requested NSSAI in the AS in the registration request originated after receiving the registration reject message. In this way, when the UE sends registration information again, the UE can select the target network slice information based on the first cell, and the 5G base station, when receiving the registration information including the requested NSSAI from the UE, determines the corresponding target AMF network element based on the target network slice information in the requested NSSAI, so as to select a correct AMF network element, such that the UE can be successfully registered to the target AMF network element. Therefore, by applying the registration method provided by the embodiments of the present disclosure, the problem that the UE cannot be normally registered based on an access and mobility function (AMF) network element reallocation flow of RAN under 5G core network slice isolation networking can be solved.

After the embodiment shown in FIG. 2 is completed, as an embodiment, the method further includes the following step A to step B subsequent to receiving the UE registration information sent through the 5G base station.

At step A, based on an identifier for identifying a UE included in the UE registration information, whether the UE corresponding to the identifier has ever been successfully registered on the AMF network element is determined; if yes, step B is performed and otherwise, the step 102 is performed.

After receiving the UE registration information from the UE, the AMF network element does not know the identity of the UE and thus cannot determine whether the network slice in the AMF network element is capable to serve the UE. If the UE has ever been successfully registered on the AMF network element, and the integrity protection security of the UE registration request is successfully verified, it means that the AMF network element is capable to serve the UE. If the UE fails to be successfully registered on the AMF network element, it means that the AMF network element needs to perform security/authentication flow and subscription information obtaining flow with the UE to determine an AMF network element capable of serving the UE.

At step B, when the integrity protection security of the UE registration information is successfully verified, the UE is registered on the AMF network element and a message for indicating successful registration is sent to the UE.

The AMF network element verifies the integrity protection security of the UE registration information. If the integrity protection security is successfully verified, step B is performed. In some other embodiments, the AMF network element can further verify whether the UE registration information is encrypted. If the UE registration information is encrypted and the integrity protection security of the UE registration information is successfully verified, step B is performed.

Hence, by applying the technical solution provided by the present embodiment, an AMF network element capable of serving a UE can be quickly found for the UE.

As another embodiment, after the AMF network element finds the UE is unsuccessfully registered, it is required to perform AMF network element reallocation flow. At this time, the method further includes: when the AMF network element is the target AMF network element, obtaining the registration request forwarded by the 5G base station, and based on the registration request, successfully routing the UE to the target AMF network element. In this embodiment, the AMF network element is the target AMF network element, which means that the AMF network element is capable to serve the UE. In other words, the target AMF network element is the AMF network element capable of serving the UE.

As another embodiment, after the UE is successfully registered on the target AMF network element, a registration acceptance message including a target cell with a set network slice is sent to the UE, such that the UE, when subsequently re-originating a network slice request, selects a network slice from the target cell as requested NSSAI. In this embodiment, when the UE is power on for the first time, the UE does not know which network slices are available. After the UE is registered to the AMF1 network element, the AMF1 network element places the target cell including the network slice capable of serving the UE into the registration acceptance message, such that the UE, when subsequently originating a network slice request, selects a network slice from the target cell. The target cell is configured to notify that the UE that the network slices included in the target cell are selectable, and the selected network slice is an intersection of the network slices supported by the AMF network element and the network slices subscribed to by the UE. The target cell can be allowed NSSAI or configured NSSAI.

Here, the descriptions of the above embodiment are completed.

In order to make the embodiments of the present disclosure clearer, descriptions are made herein with an example as shown below.

In a scenario under 5G network slice isolation networking shown in FIG. 2, the registration process of a UE is performed as below.

The gNB1 defaults that the UE will access the AMF1 network element in the AMF Set1. The gNB1 receives UE registration information sent through the gNB1, and the AMF1 network element, based on an identifier for identifying the UE included in the UE registration information, determines whether the UE corresponding to the identifier has ever been successfully registered on the AMF network element; if the UE has ever been successfully registered, it indicates that the AMF network element is capable to serve the UE and the UE is successfully registered to the AMF network element; if the UE fails to be successfully registered, it indicates that the AMF network element needs to find an AMF network element capable of serving the UE for the UE.

The UE moves from the coverage scope of the gNB1 to the coverage scope of the gNB2 and then accesses network again. If the AS by which the UE interacts with the gNB2 does not include valid identity information and network slice information, the gNB2 defaults that the UE will access the AMF3 network element in the AMF Set2. At this time, due to no user context, the AMF3 network element originates a security flow to the UE. After the security negotiation is completed, the AMF3 network element interacts with the NSSF network element to perform network slice selection. After network slice selection decision, it is determined that AMF network element reallocation is required and that the target AMF Set is indicated as AMF Set1.

The AMF3 network element performs AMF network element reallocation flow through the gNB2, indicating rerouting the UE registration information to the AMF Set1. At this time, the AMF1 network element in the AMF Set1 has no UE-related context. The AMF1 network element needs to perform authentication/security flow with the UE again. Since the UE has no perception for the entire rerouting process, the UE has already performed security flow with the AMF3 network element and thus cannot process the non-encrypted authentication message distributed by the AMF1 network element. As a result, the UE cannot be smoothly registered on the gNB2.

When the AMF1 network element finds that the UE is unsuccessfully registered to the AMF1 network element, the AMF1 network element sends to the UE a registration reject message, which includes at least a first cell including network slice information configured for the AMF1 network element and a second cell for indicating the UE to carry requested NSSAI in an AS interacting with the 5G base station in a registration request originated after receiving the registration reject message.

After receiving the registration reject message sent by the AMF1 network element through the gNB2, the UE, based on the first cell included in the registration reject message, selects the target network slice information to form the requested NSSAI. These target network slices are network slices capable of serving the UE. The registration request of the UE is rerouted through the gNB2 again, where the registration request includes the requested NSSAI. After receiving the registration request including the requested NSSAI from the UE, the gNB2, based on the target network slice information in the requested NSSAI, determines a corresponding target AMF network element, such that the UE can be successfully registered to the target AMF network element.

Here, descriptions of the above example are completed.

Figure 4:
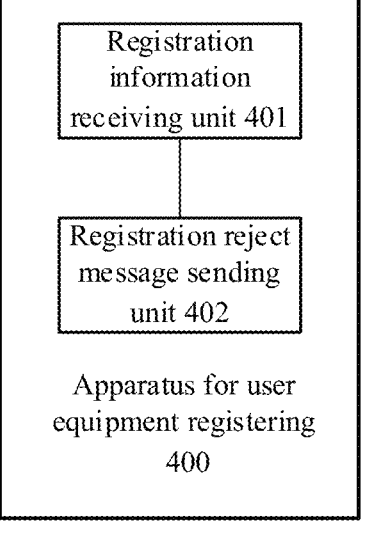
FIG. 4 is a structural diagram illustrating an apparatus for UE registering according to the present disclosure.

FIG. 4 is a structural diagram illustrating an apparatus 400 for user equipment (UE) registering according to an embodiment of the present disclosure. The method is applied to an access and mobility function (AMF) network element at the 5G core network. The apparatus includes:

a registration information receiving unit 401, configured to receive registration information of a UE from a 5G base station;

a registration reject message sending unit 402, configured to, when the UE is unsuccessfully registered on the AMF network element, send a registration reject message including at least a first cell and a second cell to the UE; where the first cell includes network slice information configured for the AMF network element, and the second cell is configured to indicate the UE to include requested network slice selection assistance information (NSSAI) in an access stratum (AS) interacting with the 5G base station in a registration request originated after receiving the registration reject message;

where the requested NSSAI includes target network slice information selected by the UE based on the first cell; the requested NSSAI is configured to indicate that the 5G base station, when receiving the registration request including the requested NSSAI from the UE, determines a corresponding target AMF network element based on the target network slice information in the requested NSSAI, such that the UE is successfully registered to the target AMF network element.

As an embodiment, after receiving the registration information of the UE from the 5G base station, the apparatus further includes:

a registration determining unit, configured to, based on an identifier for identifying the UE included in the registration information of the UE, determine whether the UE corresponding to the identifier has ever been successfully registered on the AMF network element; where, if the UE corresponding to the identifier has ever been successfully registered on the AMF network element, a registering unit is triggered, and otherwise, the registration reject message sending unit is triggered;

where the registering unit is configured to, when integrity protection security of the registration information of the UE is successfully verified, register the UE on the AMF network element and send a message indicating successful registration to the UE.

As an embodiment, the apparatus further includes:

a registering unit configured to, when the AMF network element is the target AMF network element, obtain the registration request forwarded by the 5G base station, and based on the registration request, successfully register the UE to the target AMF network element.

As an embodiment, the apparatus further includes: a registration acceptance message sending unit, configured to, after the UE is successfully registered to the target AMF network element, send a registration acceptance message including a target cell with a set network slice to the UE, such that the UE, when subsequently re-originating a network slice request, selects a network slice from the target cell to construct the requested NSSAI.

As an embodiment, the registration information of the UE is sent by the 5G base station in a scenario that the UE moves from a coverage scope of other 5G base station to a coverage scope of the 5G base station, or, the registration information of the UE is sent by the 5G base station in a scenario that the UE, after being successfully registered to an AMF network element of other 5G base station, is power off, and then is moved to the coverage scope of the 5G base station and power on.

Here, the descriptions of the structural diagram of the apparatus shown in FIG. 4 are completed.

It can be seen from the above technical solutions that in the present disclosure, in the scenario under 5G core network slice isolation networking, when the AMF network element finds that the UE is unsuccessfully registered on the AMF network element, the AMF network element sends to the UE the registration reject message, which includes the first cell including the network slice information configured for the AMF network element and the second cell for indicating the UE to include the requested NSSAI in the AS in the registration request originated after receiving the registration reject message. In this way, when the UE sends registration information again, the UE can select the target network slice information based on the first cell; and the 5G base station, when receiving the registration information including the requested NSSAI from the UE, determines the corresponding target AMF network element based on the target network slice information in the requested NSSAI, such that the UE can be successfully registered to the target AMF network element. Therefore, by applying the registration method provided by the embodiments of the present disclosure, the problem that the UE cannot be normally registered based on the AMF network element reallocation flow of RAN under 5G core network slice isolation networking can be solved.

The implementation process of the functions and effects of the devices in the apparatus can be referred to the implementation process of the corresponding steps in the above methods and will not be repeated herein.

Figure 5:
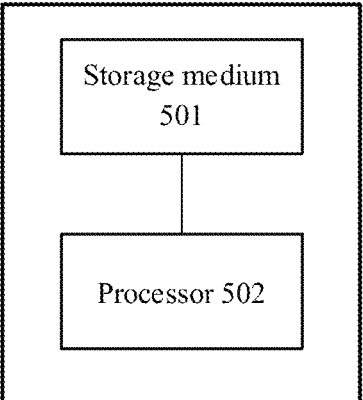
FIG. 5 is a structural diagram illustrating an electronic device according to the present disclosure.

An embodiment of the present disclosure further provides an electronic device. From hardware level, the hardware architecture diagram can be referred to FIG. 5. The electronic device includes a machine-readable storage medium 501 and a processor 502; where the machine-readable storage medium is configured to store machine-executable instructions executable by the processor; and the processor is configured to read and execute the machine-executable instructions to perform the method of UE registering under 5G network slice isolation as described in the above embodiments.

An embodiment of the present disclosure further provides a machine-readable storage medium, storing machine-executable instructions, where the machine-executable instructions are invoked and executed by a processor to perform the method of UE registering under 5G network slice isolation as described in the above embodiments.

The machine-readable storage medium mentioned herein can be any of electronic, magnetic, optical or other physical storage devices and can contain or store information such as executable instructions, data and so on. For example, the machine-readable storage medium can be a random access memory (RAM), a volatile or non-volatile memory, a flash memory, a storage drive (e.g., hard disk drive), a solid-state hard disk, any type of storage disk (e.g., compact disk, digital video disk (DVD)), or a similar storage medium, or a combination thereof.

The systems, apparatuses, modules or units described in the above examples can be specifically implemented by a computer chip or an entity or can be implemented by a product with a particular function. A typical implementing device can be a computer and the computer can be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For convenience of description, the above apparatus is divided into different units based on functionality for descriptions. Of course, the functions of different units can be implemented in a same or a plurality of hardware and/or software when practicing the present disclosure.

The persons skilled in the art should understand that the examples of the present disclosure can be provided as a method, a system, or a computer program product. Thus, entire hardware examples, entire software examples or examples combining software and hardware can be adopted in the present disclosure. Further, the present disclosure can be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in examples of the present disclosure. It is understood that each flowchart and/or block in the flowcharts and/or the block diagrams or a combination of a flow chart and/or a block of the flowcharts and/or the block diagrams can be implemented by computer program instructions. These computer program instructions can be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions can also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions can also be loaded on a computer or another programmable data processing device, so that a series of operation steps can be executed on the computer or another programmable device to generate processing achieved by the computer, and thus instructions executable on the computer or another programmable device are provided for steps for realizing functions designated in one or more flows of the flowcharts and/or one or more blocks of the block diagrams.

Since the apparatus embodiments substantially correspond to the method embodiments, a reference can be made to part of the descriptions of the method embodiments for the related part. The apparatus embodiments described above are merely illustrative, where the units described as separate members can be or not be physically separated, and the members displayed as units can be or not be physical units, i.e., can be located in one place, or can be distributed to a plurality of network units. Part or all of the modules can be selected according to actual requirements to implement the objectives of the solutions in the embodiments. Those of ordinary skill in the art can understand and carry out them without creative work.

The foregoing descriptions are made to embodiments of the present disclosure but not intended to limit the present disclosure. Various modifications, equivalent substitutions and improvements made within the spirit and principle of the present disclosure shall all fall within the scope of protection of the present disclosure.

The invention claimed is:

1. A method of user equipment (UE) registering, applied to an access and mobility management function (AMF) network element at a 5G core network, and comprising:
    receiving registration information of a UE from a 5G base station;
    when the UE is unsuccessfully registered on the AMF network element, sending a registration reject message comprising at least a first cell and a second cell to the UE;
    wherein the first cell comprises network slice information configured for the AMF network element, and the second cell is configured to indicate the UE to carry requested network slice selection assistance information (NSSAI) in an access stratum (AS) in a registration request originated after receiving the registration reject message;
    wherein the requested NSSAI comprises target network slice information selected by the UE based on the first cell; the requested NSSAI is configured to indicate that the 5G base station, in response to receiving the registration request comprising the requested NSSAI from the UE, determines a corresponding target AMF network element based on the target network slice information in the requested NSSAI, such that the UE is successfully registered to the target AMF network element.

2. The method of claim 1, wherein after receiving the registration information of the UE from the 5G base station, the method further comprises:
    determining, based on an identifier for identifying the UE in the registration information of the UE, whether the UE corresponding to the identifier has ever been successfully registered on the AMF network element;
    in response to determining that the UE corresponding to the identifier has ever been successfully registered on the AMF network element, in a case that integrity protection security of the registration information of the UE is successfully verified, registering the UE on the AMF network element and sending a message indicating successful registration to the UE;
    in response to determining that the UE corresponding to the identifier fails to be successfully registered on the AMF network element, performing a step of sending the registration reject message comprising at least the first cell and the second cell to the UE.

3. The method of claim 1, further comprising:
    in response to determining that the AMF network element is the target AMF network element, obtaining the registration request forwarded by the 5G base station, and based on the registration request, successfully registering the UE to the target AMF network element.

4. The method of claim 3, further comprising: after the UE is successfully registered to the target AMF network element, sending a registration acceptance message comprising a target cell with a set network slice to the UE, such that the UE, when subsequently re-originating a network slice request, selects a network slice from the target cell to construct the requested NSSAI.

5. The method of claim 1, wherein the registration information of the UE is sent by the 5G base station in a scenario that the UE is moved from a coverage scope of other 5G base station to a coverage scope of the 5G base station, or, the registration information of the UE is sent by the 5G base station in a scenario that the UE after being successfully registered to an AMF network element of other 5G base station, is power off and then is moved to the coverage scope of the 5G base station and power on.

6. An electronic device, comprising: a processor and a non-transitory machine-readable storage medium; wherein, the machine-readable storage medium is configured to store machine-executable instructions;

the processor is configured to read and execute the machine-executable instructions stored in the machine-readable storage medium to perform operations comprising:

receiving registration information of a UE from a 5G base station;

when the UE is unsuccessfully registered on the AMF network element, sending a registration reject message comprising at least a first cell and a second cell to the UE;

wherein the first cell comprises network slice information configured for the AMF network element, and the second cell is configured to indicate the UE to carry requested network slice selection assistance information (NSSAI) in an access stratum (AS) in a registration request originated after receiving the registration reject message;

wherein the requested NSSAI comprises target network slice information selected by the UE based on the first cell; the requested NSSAI is configured to indicate that the 5G base station, in response to receiving the registration request comprising the requested NSSAI from the UE, determines a corresponding target AMF network element based on the target network slice information in the requested NSSAI, such that the UE is successfully registered to the target AMF network element.

7. The electronic device of claim 6, wherein after receiving the registration information of the UE from the 5G base station, the processor is further configured to perform operations comprising:

determining, based on an identifier for identifying the UE in the registration information of the UE, whether the UE corresponding to the identifier has ever been successfully registered on the AMF network element;

in response to determining that the UE corresponding to the identifier has ever been successfully registered on the AMF network element, in a case that integrity protection security of the registration information of the UE is successfully verified, registering the UE on the AMF network element and sending a message indicating successful registration to the UE;

in response to determining that the UE corresponding to the identifier fails to be successfully registered on the AMF network element, performing a step of sending the registration reject message comprising at least the first cell and the second cell to the UE.

8. The electronic device of claim 6, the processor is further configured to perform operations comprising:

in response to determining that the AMF network element is the target AMF network element, obtaining the registration request forwarded by the 5G base station, and based on the registration request, successfully registering the UE to the target AMF network element.

9. The electronic device of claim 8, the processor is further configured to perform operations comprising: after the UE is successfully registered to the target AMF network element, sending a registration acceptance message comprising a target cell with a set network slice to the UE, such that the UE, when subsequently re-originating a network slice request, selects a network slice from the target cell to construct the requested NSSAI.

10. The electronic device of claim 6, wherein the registration information of the UE is sent by the 5G base station in a scenario that the UE is moved from a coverage scope of other 5G base station to a coverage scope of the 5G base station, or, the registration information of the UE is sent by the 5G base station in a scenario that the UE after being successfully registered to an AMF network element of other 5G base station, is power off and then is moved to the coverage scope of the 5G base station and power on.

11. A non-transitory machine-readable storage medium, storing computer programs, wherein the computer programs are executed by a processor to perform operations comprising:

receiving registration information of a UE from a 5G base station;

when the UE is unsuccessfully registered on the AMF network element, sending a registration reject message comprising at least a first cell and a second cell to the UE;

wherein the first cell comprises network slice information configured for the AMF network element, and the second cell is configured to indicate the UE to carry requested network slice selection assistance information (NSSAI) in an access stratum (AS) in a registration request originated after receiving the registration reject message;

wherein the requested NSSAI comprises target network slice information selected by the UE based on the first cell; the requested NSSAI is configured to indicate that the 5G base station, in response to receiving the registration request comprising the requested NSSAI from the UE, determines a corresponding target AMF network element based on the target network slice information in the requested NSSAI, such that the UE is successfully registered to the target AMF network element.

12. The non-transitory machine-readable storage medium of claim 11, wherein after receiving the registration information of the UE from the 5G base station, the computer programs are executed by the processor to perform operations comprising:

determining, based on an identifier for identifying the UE in the registration information of the UE, whether the UE corresponding to the identifier has ever been successfully registered on the AMF network element;

in response to determining that the UE corresponding to the identifier has ever been successfully registered on the AMF network element, in a case that integrity protection security of the registration information of the UE is successfully verified, registering the UE on the AMF network element and sending a message indicating successful registration to the UE;

in response to determining that the UE corresponding to the identifier fails to be successfully registered on the AMF network element, performing a step of sending the registration reject message comprising at least the first cell and the second cell to the UE.

13. The non-transitory machine-readable storage medium of claim 11, the computer programs are executed by the processor to perform operations comprising:

in response to determining that the AMF network element is the target AMF network element, obtaining the registration request forwarded by the 5G base station, and based on the registration request, successfully registering the UE to the target AMF network element.

14. The non-transitory machine-readable storage medium of claim 13, the computer programs are executed by the processor to perform operations comprising: after the UE is successfully registered to the target AMF network element, sending a registration acceptance message comprising a target cell with a set network slice to the UE, such that the UE, when subsequently re-originating a network slice request, selects a network slice from the target cell to construct the requested NSSAI.

15. The non-transitory machine-readable storage medium of claim 11, wherein the registration information of the UE is sent by the 5G base station in a scenario that the UE is moved from a coverage scope of other 5G base station to a coverage scope of the 5G base station, or, the registration information of the UE is sent by the 5G base station in a scenario that the UE after being successfully registered to an AMF network element of other 5G base station, is power off and then is moved to the coverage scope of the 5G base station and power on.

\* \* \* \* \*